United States Patent [19]

Taylor

[11] Patent Number: 5,609,794

[45] Date of Patent: Mar. 11, 1997

[54] DEMULSIFIER FOR WATER-IN-OIL EMULSIONS, AND METHOD OF USE

[75] Inventor: Grahame N. Taylor, Houston, Tex.

[73] Assignee: Exxon Chemical Patents, Inc., Linden, N.J.

[21] Appl. No.: 286,779

[22] Filed: Aug. 5, 1994

[51] Int. Cl.$^6$ ............ B01D 17/04; C08G 63/91; C08L 67/00
[52] U.S. Cl. ............ 252/341; 252/340; 525/32
[58] Field of Search ............... 252/329, 331, 252/340, 341, 343, 344; 210/708; 525/32

[56] References Cited

U.S. PATENT DOCUMENTS

| | | | |
|---|---|---|---|
| 2,950,299 | 8/1960 | Kirkpatrick | 252/331 |
| 3,424,565 | 1/1969 | Ptacek et al. | 252/331 X |
| 3,557,017 | 1/1971 | Mange et al. | 252/339 |
| 3,835,060 | 9/1974 | Maddox et al. | 252/358 |
| 4,465,817 | 8/1984 | Billenstein et al. | 525/507 |
| 5,164,116 | 11/1992 | Berkhof et al. | 252/331 |
| 5,460,750 | 10/1995 | Diaz-Arauzo | 252/331 |
| 5,472,617 | 12/1995 | Barthold et al. | 252/344 |
| 5,505,878 | 4/1996 | Taylor et al. | 252/358 |

FOREIGN PATENT DOCUMENTS 1010740  5/1977  Canada.

Primary Examiner—Richard D. Lovering
Assistant Examiner—Daniel S. Metzmaier
Attorney, Agent, or Firm—Robert L. Graham

[57] ABSTRACT

A water-in-oil demulsifier is prepared by (a) reacting a high molecular weight polyalkylene glycol (PAG) with ethylene oxide (EO) to form a PAG/EO adduct, (b) esterifying the PAG/EO adduct with a diacid anhydride to form a diester, (c) reacting the diester with a vinyl monomer, and (d) additional esterification of the step (c) product with a polyhydric material.

9 Claims, No Drawings

DEMULSIFIER FOR WATER-IN-OIL EMULSIONS, AND METHOD OF USE

BACKGROUND OF THE INVENTION

This invention relates generally to a method of demulsifying water-in-oil emulsions using polyalkylene glycol derivatives. In one aspect, the method relates to the demulsification of crude oil and water emulsion.

In the production of oil from oil wells, the produced fluids frequently include water in the form of free water or emulsion. In order for the oil to be of pipeline quality, it is necessary to reduce the water content to below a specified amount (e.g. below 1.0%).

A variety of mechanical, electrical, and chemical methods are used in the dehydration of produced fluids. The present invention relates specifically to the chemical treatment using chemicals referred to as demulsifiers. A demulsifier is defined as a single or a blend of surfactant compounds in a suitable solvent system which is formulated to treat a particular emulsion on an optimum cost/performance basis. The method of the present invention employs demulsifiers for treating water-in-oil emulsions, the most common type of emulsions encountered in oil field production. It specifically excludes the treatment of oil-in-water type emulsions (i.e. reverse emulsions).

A variety of demulsifiers are known in the art, including those derived from alcohols, fatty acids, fatty amines, glycols, and alkylphenol formaldehyde condensation product.

As noted above, the method of the present invention involves the use of certain polyalkylene glycol derivatives, specifically adducts of a high molecular weight polyalkylene glycol and ethylene oxide which is esterified to form a novel water-in-oil demulsifier.

As illustrated by the following references, polyalkylene glycol and its derivatives have been long used in the demulsification of oils.

(a) U.S. Pat. No. 4,374,734 discloses the use of polyoxypropylene polyol (mw of 2,000 to 4,500) for the breaking of water-in-oil emulsions wherein the emulsion is produced by surfactant flooding.

(b) U.S. Pat. No. 3,835,060 teaches that conventional demulsifiers include polyoxyalkylene glycol and block polymers of polyoxyethylene-polyoxypropylene.

(c) U.S. Pat. No. 2,754,271 discloses treating agents comprising an addition product of an alkylene oxide with an aliphatic dihydric alcohol and further describes the dihydric alcohol (polyoxypropylene diols) are known to have molecular weights as high as about 3,000.

(d) U.S. Pat. No. 3,557,017 discloses water-in-oil demulsifiers comprising ultra high molecular weight (of molecular weight at least 100,000) polymers. The polymers are selected from a group that includes polyoxyalkylene polymers and copolymers of monomeric alkylene oxides having a single vicinal epoxy group.

(e) Canadian Patent No. 1010740 discloses a water-in-oil emulsion breaker which is the reaction product of a polyoxyalkylene alcohol and an unsaturated reactant, which product is further reacted with a vinyl addition monomer. In one embodiment, this product is further reacted with a polyoxyalkylene alcohol.

Other references which disclose low molecular weight polyalkylene polyhydric reacted with other compounds include U.S. Pat. Nos. 3,383,326, 3,511,882, and 3,676,501. Other references which disclose polyhydric alcohols but not glycols include U.S. Pat. Nos. 2,996,551, 3,078,271, and 4,305,835. References which disclose water-in-oil demulsifiers include U.S. Pat. Nos. 3,383,325; 4,117,031; 4,420,413; 4,465,817; and 5,039,450.

SUMMARY OF THE INVENTION

The method of the present invention involves treating water-in-oil emulsions of petroleum operations with a demulsifier to break the emulsion and separate the oil and water. The demulsifier is a derivative or adduct of a high molecular weight dihydric polyalkylene glycol (PAG) and ethylene oxide (EO) and is prepared using the following reactants:

(a) PAG, a diol, having a molecular weight of at least 6000, (b) EO, (c) an unsaturated diacid, diester or diacid anhydride, preferably maleic anhydride, (d) a vinyl monomer, preferably acrylic acid, and (e) a polyoxyalkylene alcohol, preferably an oxyalkylated phenol formaldehyde resin, most preferably an oxyalkylated p-nonylphenol formaldehyde resin.

These compounds are reacted in the following sequence:

| Step 1 | Addition Reaction |
| Step 2 | Esterification |
| Step 3 | Radical vinyl polymerization reaction with vinyl monomer |
| Step 4 | Additional esterification with a polyoxyalkylated alcohol (e.g. oxyalkylated phenol formaldehyde resin). |

A novel feature of the present invention is the high molecular weight of the precursor dihydric polyalkylene glycol [polypropylene glycol (PPG) or polybutylene glycol (PBG)]. PPG diols and PBG diols of MW greater than 4,000 to 5,000 have not previously been used in the synthesis of water-in-oil demulsifiers. The high molecular weight of the PAG derivative demulsifier offers the advantage of superior initial water drop and oil dehydration when acting alone or with other conventional demulsifiers.

Another novel feature of a preferred embodiment of the invention is the use of two separate hydroxy compounds for the esterification in Steps 2 and 4, respectively (e.g. PAG and oxyalkylated phenol formaldehyde resin).

In addition, the present invention involves the use of the adducts described above in combination with other demulsifiers, particularly oxyalkylated phenol formaldehyde resins, polyalkylene glycols, and esters.

DESCRIPTION OF THE PRECEDED EMBODIMENTS

As indicated above, the demulsifier of the present invention is the reaction product of five compounds. Each of the compounds and their reactions are described in detail below.

Step 1: Preparation of the PAG/EO Adduct

The precursor PAG in a preferred embodiment of the present has the following formula:

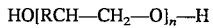

where

R is $CH_3$ or $C_2H_5$; and n ranges from 120 to 350, preferably 135 to 260, and most preferably 150 to 200; and the compound has a molecular weight greater than 6,000 and up to 26,000. Preferably R is $CH_3$ and the molecular weight of the polyalkylene glycol is between 7,000 and 20,000 and most preferably between 8,000 and 18,000. Molecular weight refers to that calculated from hydroxyl number measurement.

The precursor PAG having the proper molecular weight for use in the present invention may be prepared using a catalyst selected from the group consisting of barium, strontium and their oxides, hydroxides, hydrated hydroxides or monohydroxide salts, or mixtures thereof or a double metal cyanide complex compound wherein one of the metals of said complex compound is selected from the group consisting of Zn(II), Fe(II), Fe(III), Co(II), Ni(II), Mo(IV), Mo(VI), Ai(III), V(IV), V(V), Sr(II), W(IV), W(VI), Mn(II), and Cr(III) and mixtures thereof, and wherein the other metal of said complex compound is a metal selected from the group consisting of Fe(II), Fe(III), Co(II), Co(III), Cr(II), Cr(III), Mn(II), Mn(III), V(IV), and V(V) and mixtures thereof. These methods are described in detail in U.S. Pat. Nos. 5,010,187 and 3,278,457, the disclosures of which are incorporated herein by reference.

The addition reaction of the PAG with ethylene oxide forms an adduct having the following formula (Formula I):

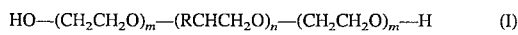

$$HO\text{---}(CH_2CH_2O)_m\text{---}(RCHCH_2O)_n\text{---}(CH_2CH_2O)_m\text{---}H \quad (I)$$

where R and n are as defined above, and m ranges from 1 to 100, preferably from 3 to 60, most preferably 5 to 50. For convenience, this adduct is represented by the formula of HO—X—H where X represents the polyoxyalkylene groups.

This reaction may be carried out under the following conditions: The polyalkylene glycol is dissolved in a hydrocarbon solvent and catalyzed with an alkaline or alkaline earth metal hydroxide. The partial alkoxide of the polyalkylene glycol is reacted at 150° C. at 50 psi with ethylene oxide for approximately 2 hours.

Step 2: Esterification of the PAG/EO Adduct with Diacid Anhydride to form PAG/EO Adduct Diesters The esterification reaction of the hydroxyl groups of the Formula I adduct with a diacid anhydride extends the molecular chain. The reaction produces Formula II product:

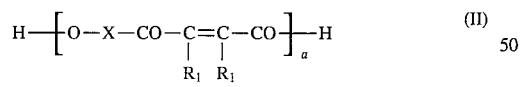

where X is the polyoxyalkylene groups defined above, and $R_1$ is H or alkyl or aryl group having from 1 to 50 carbon atoms, preferably 2 to 25 carbon atoms, and a is an integer ranging from 1 to 100, preferably 5 to 50.

The preferred reactant is maleic anhydride, which upon reaction with the Formula I adduct, produces the Formula II product where $R_1$ is H. Other useful compounds include those having (a) a diacid or diacid anhydride functionality, and (b) at least one olefinic unsaturation. Such compounds are commercially available. By way of example, these include fumaric acid, maleic anhydride adduct of tall oil fatty acid and 5,6-carboxy-4-hexyl-2-cyclohexene-1-octanoic acid.

The esters of Formula I and the diacid anhydride may be prepared as follows:

The adduct is dissolved in a hydrocarbon and catalyzed using an acid such as p-toluene sulphonic or dodecylbenzene sulphonic. The polyalkylene glycol is refluxed at 150° C. with the appropriate diacid or diacid anhydride under Dean Stark azeotropic distillation to remove water.

The mole ratio of the Formula I compound and the diacid anhydride may range between 0.5 to 3, preferably between 0.8 to 1.2.

Step 3: Addition Reaction of the Diester with Vinyl Monomer

The Formula II ester is dissolved in a hydrocarbon solvent and a catalytic quantity of an organic peroxide is added. The solution is brought to 100° C. and the vinyl monomer is slowly added to the solution. After complete addition of the vinyl monomer, the reaction mixture is heated under reflux at 150° C. for 1–2 hours.

The addition reaction product will depend on the vinyl monomer employed. The generic formula may be represented by Formula III:

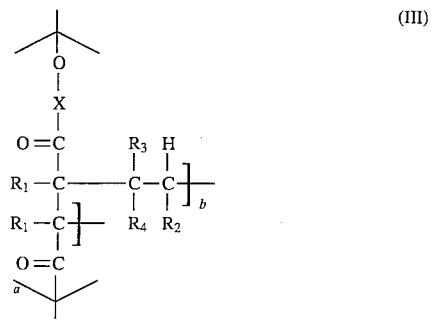

where $R_1$ and X are as defined above, $R_2$ is COOH or $COOC_{n'}H_{2n'+1}$ $R_3$ is H, COOH, $COOC_{n1'}H_{2n'+1}$, $O\text{---}C_{n'}H_{2n'+1}$, $CONH_2$ $R_4$ is H, COOH, $COOC_{n'}H_{2n+1}$, CN, where n' is an integer ranging from 1 to 6;

a and b are each integers ranging from 1 to 100.

The mole ratio of the Formula II ester and vinyl monomer may range from 0.5 to 3, preferably 0.8 to 1.2.

The preferred vinyl monomer is acrylic acid, in which case the $R_2$ in Formula III is $CO_2H$, and $R_3$ and $R_4$ are each H.

Step 4: Additional Esterification

The molecular chain of the Formula III product (where $R_2$ is COOH) is extended by reaction with a polyhydric material such as an oxyalkylated compound which produces Formula IV product:

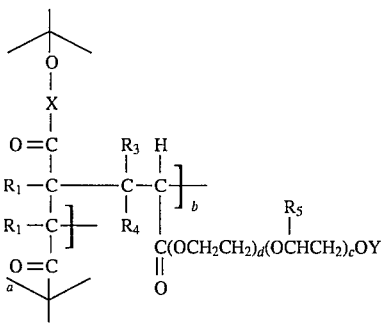

where

X, $R_1$, $R_3$, $R_4$, a, and b are as defined above and $R_5$ is $CH_3$ or $C_2H_5$, Y is a polyoxyalkylene alcohol group, c and d are each integers ranging from 0 to 20 and c+d is 1 or more.

The preferred Y is a para alkylphenol formaldehyde resin having the following formula

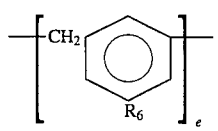

where $R_6$ is a $C_1$ to $C_{20}$ hydrocarbon group, preferably a $C_4$ to C9, and e is 2 to 25.

The mole ratio of the Formula III product and the polyhydric material may range from 1 to 10, preferably 2 to 5.

Demulsifier Formulation

In tailoring the demulsifier formulation for a particular treatment, it may be preferred in many such treatments to combine the demulsifier described above with other demulsifiers. The commercially available demulsifier which can be used in a blend with the adducts described above include the following:

(a) polyfunctional polyalkylene glycols Example formula:

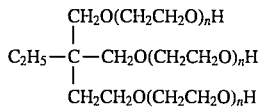

where n ranges from 1 to 200.

(b) oxyalkylated phenol formaldehyde resins having a molecular weight between 1,000 to 20,000.

(c) derivatives of the above.

These commercially available demulsifiers are oxyalkylation products of ethylene or propylene oxide with fatty acids, fatty amines, glycols, or phenol-formaldehyde condensation compounds.

The preferred demulsifiers useable with the demulsifer of the present invention are the oxyalkylated glycol esters and/or the oxyalkylated phenol formaldehyde resins.

When blends are used, the demulsifier of the present invention should constitute from 5 to 95 vol. % of the actives in a suitable solvent.

Operation

In carrying out the method of the present invention, the Formula IV product dissolved in a suitable solvent is prepared. The formulation may include other additives which provide additional function or enhancement to the effectiveness of the demulsifier. Solvents include aromatic hydrocarbon solvents such as xylene, etc. Additional additives include commercial demulsifiers described above, polyalkylene glycol esters and oxyalkylated phenol formaldehyde resins.

The percent of active demulsifier in the formulation may range within wide limits, but 5 to 90 wt % is preferred, most preferably 25 to 75 wt %.

The composition and concentration of the actives in the formulation will be tailored for a specific treatment in the same manner conventional demulsifiers are applied. This "fine tuning" of the formulation is frequently based on bottle tests. For crude oil treatment, the water-in-crude oil emulsion may range from 1 to 99 vol % water. In treating refined petroleum products, (e.g. lube oil, gasoline, fuel oil, kerosene, etc.), the suspended water, of course, is much lower, generally less than 1%. Treatment concentrations of the demulsifier (actives) described herein may range from 10 to 1,000 ppm, preferably 150 to 500 ppm actives in the emulsion, and may be injected into the system by conventional procedure and equipment: downhole injection, wellhead injection, or batch treatment.

EXPERIMENTS

Bottle Tests

Bottle tests were conducted by placing a water-in-oil emulsion sample (100 ml) in a graduated prescription bottle and adding a measured amount of a demulsifier chemical. Each bottle was capped and then shaken for a specified time (typically 5 minutes) in order to mix the contents. The bottles were set aside in a hot water bath and the waterdrop was observed. This is the time for separation of the water phase of the emulsion from the oil phase.

Following the waterdrop tests, each emulsion sample (free of freewater) was subjected to a centrifugation (grindout) by the following procedure:

(a) API centrifuge tubes were filled with 50% xylene and 50% of the emulsion (no free water).

(b) The samples were placed in a hot water bath for a recorded period of time.

(c) The samples were then subjected to centrifugation (grindout) at 1800 rpm for 3 minutes.

(d) The amount of water in each tube was recorded and the % of water retained in the oil determined.

The demulsifiers tested were prepared using the following materials:

(a) PPG having an MW of between 8,000 and 18,000;

(b) the unsaturated diacid was maleic anhydride;

(c) the vinyl monomer was acrylic acid;

(d) the oxyalkylated compound was para alkylphenol formaldehyde resin.

The demulsifier samples were prepared as follows:

Sample A

Formula IV where

X was PAG/EO adduct (Formula I) where n was 190 m was 5 R was $CH_3$ a and b were each between 2 to 200

$R_1$ was H $R_3$ was H $R_4$ was H
$R_5$ was $CH_3$
c was 4
d was 6
Y was

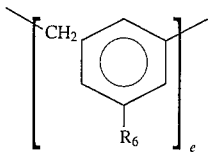

$R_6$ was $C_9H_{19}$
e ranged from 2 to 25

Sample B

Same composition as Sample A, except c was 0 and d was 3.

Sample C

Same as Sample A, except m was 15.

Sample D

Same as Sample B, except m was 15.

Sample E (comparison)

Same as Sample A, except X was an adduct of low molecular weight PAG and EO, where n was 32 and m was 4.

Sample F (comparison)

Same as Sample B, except X was an adduct of low molecular weight PAG and EO, where n was 32 and m was 4.

The bottle test results are presented in the Table:

TABLE

| Test No. | Sample | Concentration PPM | Temp. (°C.) | Elapsed Time at Water Drop (Min.) | Water Drop (%) | Water In-Oil (%) | Elapsed Time at Grindout (Min.) |
| --- | --- | --- | --- | --- | --- | --- | --- |
| I-1 | A | 10 | 80 | 15 | 40 | 0.2 | 15 |
| I-2 | C | 10 | 80 | 15 | 40 | 0.1 | 15 |
| I-C | E | 10 | 80 | 15 | 5 | 0.4 | 15 |
| II-1 | A | 10 | 80 | 5 | 22 | | |
| II-C | E | 10 | 80 | 5 | 2 | | |
| III-1 | A | 10 | 80 | 15 | 30 | 4.0 | 15 |
| III-C | E | 10 | 80 | 15 | 4 | 36.0 | 15 |
| IV-1 | A | 7 | 80 | 0 | 40 | | |
| IV-2 | C | 7 | 80 | 0 | 25 | | |
| IV-C | E | 7 | 80 | 0 | 20 | | |
| V-1 | A | 10 | 80 | 0 | 30 | | |
| V-2 | C | 10 | 80 | 0 | 40 | | |
| V-C | E | 10 | 80 | 0 | 20 | | |
| VI-1 | B* | 100 | 70 | 30 | 19 | 1.0 | 60 |
| VI-1 | D* | 100 | 70 | 30 | 19 | 0.8 | 60 |
| VI-C | F* | 100 | 70 | 30 | 15 | 1.4 | 60 |

*Demulsifier comprised 40% of the demulsifier of the present invention and 60% of 2 conventional demulsifiers, one manufactured by EXXON Chemical Company under trade designation Breaxit777, and the other as Intermediate FO698.

The data in the above Table demonstrate that the demulsifiers of the present invention were significantly more effective than the demulsifiers made with the low molecular weight (less than 2100) PAG in both the water drop tests and the centrifugation tests.

What is claimed is:

1. A method of breaking water-in-oil emulsions comprising the steps of
   (a) introducing into the water-in-oil emulsion an effective amount of an emulsion breaker to break the emulsion, said emulsion breaker prepared by
      (i) reacting a polyalkylene glycol having a molecular weight of 8,000 to 26,000 with ethylene oxide to form a polyalkylene/ethylene oxide adduct;
      (ii) reacting the adduct of step (i) with an unsaturated diacid anhydride to form an ester of the polyalkylene/ethylene oxide adduct;
      (iii) reacting the ester of step (ii) with acrylic acid to form an adduct of the step (ii) ester and acrylic acid; and
      (iv) esterifying the adduct of step (iii) with an oxyalkylated alkyl phenol formaldehyde resin.

2. The method of claim 1 wherein the PAG has a molecular weight of 8,000 to 20,000.

3. A water-in-oil demulsifier composition prepared by:
   (a) reacting a polyalkylene glycol having a molecular weight of 8,000 to 26,000 with ethylene oxide to form the following adduct:

HO—X—H where X is

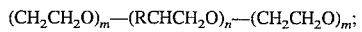

where
   m is an integer ranging between 1 to 100;
   n is an integer ranging between 120 to 350;
   R is $CH_3$ or $C_2H_5$;
   (b) reacting the adduct of step (a) with an unsaturated diacid anhydride to produce the following product:

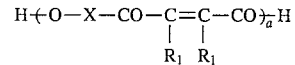

where
    a is an integer ranging between 1 to 100, and
    $R_1$ is H or an alkyl or aryl group having from 1 to 50 carbon atoms;
(c) reacting the product of step (b) with a vinyl monomer with the reaction through the carbon double bond to produce the product of step (c), wherein the vinyl monomer has the following structure:

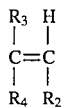

wherein
    $R_2$ is COOH or $COOC_{n'}H_{(2n'+1)}$;
    $R_3$ is H, COOH, $COOC_{n'}H_{(2n'+1)}$ or $OC_{n'}H_{(2n'+1)}$;
    $R_4$ is H, COOH, $COOC_{n'}H_{(2n'+1)}$ or CN:
    n' is an integer ranging from 1 to 6; and
    the ratio of the said vinyl monomer to said product of step (b) is 1:1 to 200:1;
(d) reacting the product of step (c) with an oxyalkylated para alkyl phenol formaldehyde compound having the following formula:

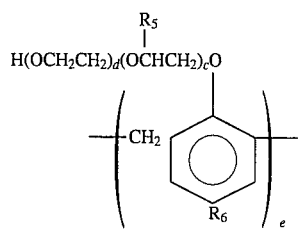

to produce a vinyl addition poller polyester; where
    $R_5$ is $CH_3$ or $C_2H_5$;
    c and d are each intergers ranging from 0 to 20, and c+d is 1 or more;
    e is an integer ranging between from 2 to 25, and
    $R_6$ is a $C_4$ to $C_9$ alkyl group.

4. The demulsifier of claim 3 wherein n of the PAG ranges from 135 to 260.

5. The demulsifier of claim 3 wherein $R_1$ is H.

6. The demulsifier of claim 3 wherein $R_2$ is COOH, $R_3$ is H, and $R_4$ is H.

7. The demulsifier of claim 6 wherein $R_5$ is $CH_3$.

8. A method of breaking water-in-oil emulsions which comprises introducing an effective amount of the demulsifier of claim 3 into a water-in-oil emulsion to significantly reduce the water content of the emulsion.

9. The method of claim 8 wherein the amount of demulsifier in the emulsion ranges from 1 to 200 ppm.

* * * * *